United States Patent
Kashiwa et al.

(10) Patent No.: US 10,768,590 B2
(45) Date of Patent: Sep. 8, 2020

(54) PLANT OPERATION SUPPORT DEVICE, PLANT OPERATION SUPPORT METHOD, AND A PROGRAM DEVICE

(71) Applicant: YOKOGAWA ELECTRIC CORPORATION, Tokyo (JP)

(72) Inventors: Ryosuke Kashiwa, Tokyo (JP); Azusa Takenaka, Tokyo (JP); Toshiaki Omata, Tokyo (JP); Shin Ishimaru, Tokyo (JP); Makoto Nakaya, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 247 days.

(21) Appl. No.: 15/176,543

(22) Filed: Jun. 8, 2016

(65) Prior Publication Data

US 2016/0364510 A1  Dec. 15, 2016

(30) Foreign Application Priority Data

Jun. 11, 2015  (JP) .................................. 2015-117988

(51) Int. Cl.
G05B 17/02  (2006.01)
(52) U.S. Cl.
CPC .................... G05B 17/02 (2013.01)

(58) Field of Classification Search
CPC ...................................................... G05B 17/02
See application file for complete search history.

(56) References Cited

U.S. PATENT DOCUMENTS

| 2005/0240382 A1* | 10/2005 | Nakaya | G05B 17/02 703/6 |
| 2013/0116830 A1* | 5/2013 | D'Amato | G05B 11/00 700/275 |
| 2017/0328811 A1* | 11/2017 | Mori | B64G 1/52 |

FOREIGN PATENT DOCUMENTS

| JP | 2002-268734 A | 9/2002 |
| JP | 2007-115176 A | 5/2007 |
| JP | 2009-009301 A | 1/2009 |
| JP | 2014-167706 A | 9/2014 |

\* cited by examiner

*Primary Examiner* — Doon Y Chow
*Assistant Examiner* — Carina Yun
(74) *Attorney, Agent, or Firm* — Sughrue Mion, PLLC

(57) ABSTRACT

A plant operation support device for simulating an operation of a plant based on information obtained from the plant, includes: an operation condition setting part that sets an operation condition of the plant and a timing for applying the operation condition; and a transient state prediction part that predicts a transient state of the plant from a specific time point to the future in a case in which the operation condition of the plant set by the operation condition setting part is applied at the timing.

11 Claims, 8 Drawing Sheets

FIG. 6

PLANT OPERATION SUPPORT DEVICE, PLANT OPERATION SUPPORT METHOD, AND A PROGRAM DEVICE

BACKGROUND OF THE INVENTION

Field of the Invention

The present invention relates to a plant operation support device, a plant operation support method, and a program device.

Priority is claimed on Japanese Patent Application No. 2015-117988, filed on Jun. 11, 2015, the content of which is incorporated herein by reference.

Description of Related Art

All patents, patent applications, patent publications, scientific articles, and the like, which will hereinafter be cited or identified in the present application, will hereby be incorporated by reference in their entirety in order to describe more fully the state of the art to which the present invention pertains.

There is a technology of performing a simulation of operation of a plant based on measurement data of the plant collected from field devices such as various measurement devices, regulator machines, or the like arranged in the plant. An example of the technology of performing the simulation is a prediction method using a regular simulator that is performed by changing an operation condition of the plant. The regular simulator predicts the final destination (stationary state) of the operating state of the plant in a case in which the operation condition is changed.

Meanwhile, in order to reduce a running cost of the plant, it is necessary to perform an operation of the plant near the limit of the product specification. This operation is hereinafter referred to as a "marginal operation". It is possible to predict the final operating state by the regular simulator. However, in a transient state, it is impossible to predict such a case as the operation of the plant temporarily separates from the product specification and exceeds the limit of the product specification. If a large margin is taken in the operation condition, it is not so necessary to take into consideration of a change of the operating state in the transient state. However, in order to perform the plant operation under the condition of the marginal operation, it is necessary to predict the operating state in various states including the transient state. For example, Japanese Unexamined Patent Application, First Publication No. 2014-167706 discloses an art in which a simulation result is displayed by a trend graph that is made from time series data of the future predictive value. Japanese Unexamined Patent Application, First Publication No. 2007-115176 discloses an art in which a predictive value of the operation condition of the plant can be obtained in accordance with contents of the operation without actually operating the plant.

By the art of Japanese Unexamined Patent Application, First Publication No. 2007-115176, it is possible to perform a virtual operation and predict a transient state. However, in a case in which the operating state temporarily may exceed the limit of the product specification in the transient state, it is necessary to take a large margin in the operation condition or perform simulations repeatedly by gradually changing the operation condition so that the operating state may not exceed the limit of the product specification in the transient state. Also, in Japanese Unexamined Patent Application, First Publication No. 2014-167706, an effective method for solving the problem of the case in which the operating state temporarily exceeds the limit of the product specification in the transient state is not described.

SUMMARY OF THE INVENTION

The present invention provides a plant operation support device, a plant operation support method, and a program device that can efficiently perform a simulation of an operation condition of a plant at the time of performing a marginal operation of the plant.

A plant operation support device for simulating an operation of a plant based on information obtained from the plant, includes: an operation condition setting part that sets an operation condition of the plant and a timing for applying the operation condition; and a transient state prediction part that predicts a transient state of the plant from a specific time point to the future in a case in which the operation condition of the plant set by the operation condition setting part is applied at the timing.

The operation condition setting part may be capable of setting a plurality of operation conditions of the plant applied at different timings. The transient state prediction part may predict the transient state in a case in which the plurality of operation conditions are applied at each of the timings if the plurality of operation conditions are set by the operation condition setting part.

The plant operation support device may further include: a prediction range setting part that sets a time range when the transient state is predicted. The transient state prediction part may predict the transient state in the time range set by the prediction range setting part.

The operation condition setting part may set the operation condition of the plant and the timing for applying the operation condition for each of a plurality of cases. The transient state prediction part may predict the transient state for each of the plurality of cases.

The transient state prediction part may generate a plurality of graph information, which are different between each of the plurality of cases, from each prediction result of the transient state corresponding to each of the plurality of cases.

The transient state prediction part may generate a combined graph information from each prediction result of the transient state corresponding to each of the plurality of cases.

A plurality of scenarios may be previously set, each of which indicates an operation to the plant and registers a predetermined tag indicating a control target in the plant. The operation condition setting part may set an operation condition of the predetermined tag, which is registered in a scenario selected from the plurality of scenarios, and a timing for applying the operation condition in accordance with an operation input by a user. The transient state prediction part may predict the transient state in a case in which the operation condition of the predetermined tag, which is registered in a scenario selected from the plurality of scenarios, is applied at the timing.

A plant operation support method using a plant operation support device for simulating an operation of a plant based on information obtained from the plant, includes: setting an operation condition of the plant and a timing for applying the operation condition; and predicting a transient state of the plant from a specific time point to the future in a case in which the operation condition of the plant that has been set is applied at the timing.

A program device storing a program causes a computer to execute: setting an operation condition of a plant and a timing for applying the operation condition; and predicting a transient state of the plant from a specific time point to the future in a case in which the operation condition of the plant that has been set is applied at the timing.

According to the present invention, the operation condition at the time when a marginal operation of the plant is performed can be simulated efficiently.

BRIEF DESCRIPTION OF THE DRAWINGS

The above features and advantages of the present invention will be more apparent from the following description of certain preferred embodiments taken in conjunction with the accompanying drawings.

FIG. 6 is a diagram showing an example of a display of an operation display screen including a condition setting screen displayed in the processing of the transient state prediction in the plant operation support device in accordance with an embodiment of the present invention.

DETAILED DESCRIPTION OF THE INVENTION

The present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

(Whole Configuration of a Plant Control System 1)

Figure 1:
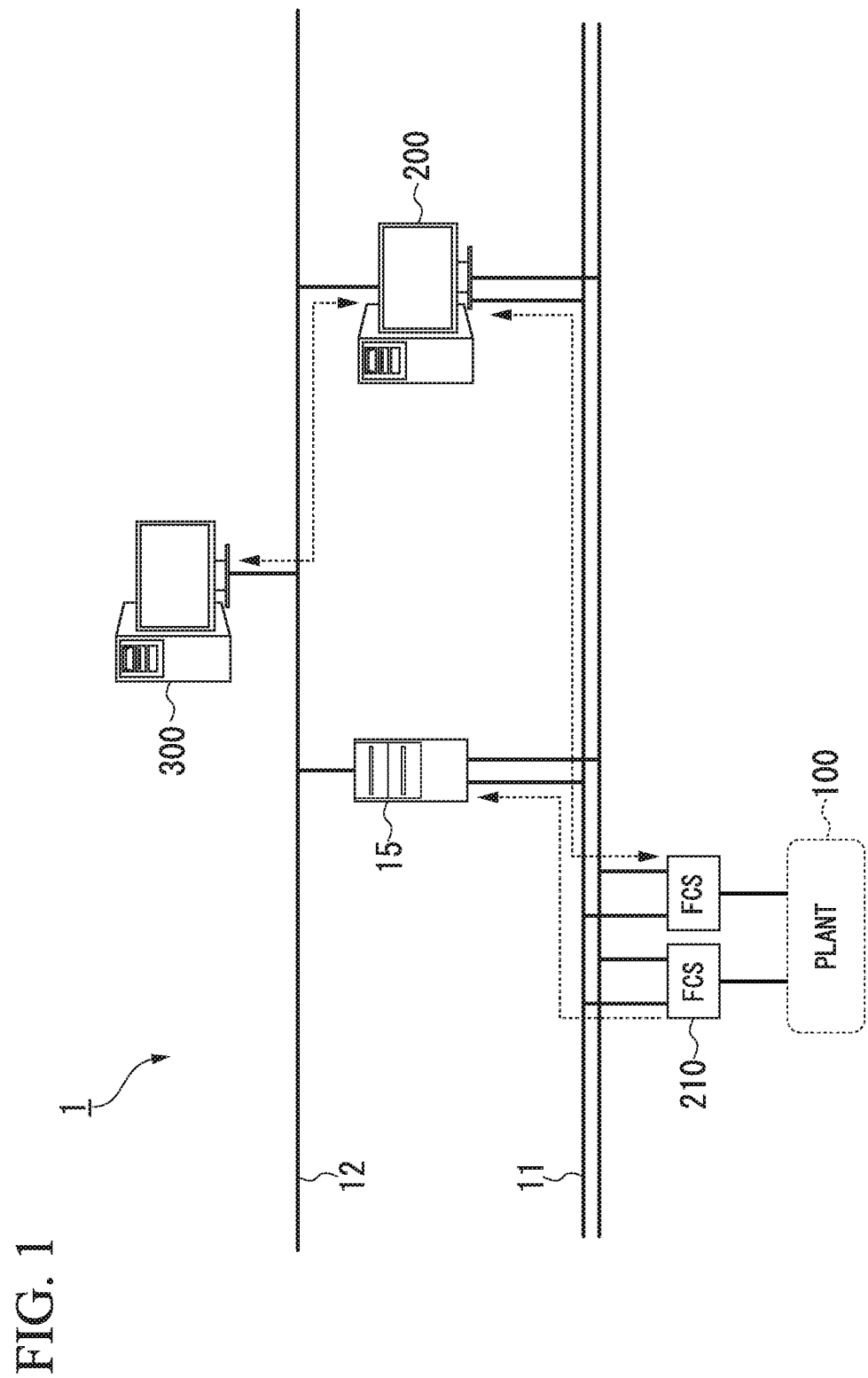
FIG. 1 is a system diagram showing an example of a plant control system that includes a plant operation support device in accordance with an embodiment of the present invention.

FIG. 1 is a system diagram showing an example of a plant control system 1 in which a plant operation support device 300 in accordance with the present embodiment is used. The plant control system 1 is a control system that performs a monitoring, a simulation of an operating state, a control, or the like of the plant 100 (real plant).

The plant 100 may be an industrial plant such as chemistry or the like, a plant for performing a management control of an well site such as a gas field, an oil field, or the like or its circumference, a plant for performing a management control of a power generation such as a hydraulic power, a fire power, an atomic power, or the like, a plant for performing a management control of an environmental power generation such as a sunlight, a wind force, or the like, and a plant for performing a management control of a sewer, a dam, or the like.

The plant control system 1 includes a plant manipulation monitoring device 200, an FCS (Field Control Station) 210, a plant operation support device 300, a control bus 11, a communication bus 12, and a gateway 15.

The plant manipulation monitoring device 200 is a computer device that works as an HIS (Human Interface Station) that performs an operation and monitoring of the plant 100. The plant manipulation monitoring device 200 includes a manipulation part operated by an operator and a display part that displays an operation and monitoring state or the like of each part of the plant 100.

The FCS 210 (Field Control Station) is a controller that performs a plant control. The FCS 210 collects data (information) from a field device (not illustrated) disposed in the plant 100 and controls a device, an apparatus, or the like provided in the plant 100 in accordance with instructions from the plant manipulation monitoring device 200.

The field device is, for example, a sensor device such as a flow instrument, a temperature sensor, or the like, a valve device such as a flow control valve, an opening-and-closing valve, or the like, an actuator device such as a fan, a motor, or the like, an image pick-up device such as a camera, a video, or the like that captures a situation and subject in the plant, an audio device such as a microphone, a speaker, or the like that collects allophones or the like in the plant or emits a warning sound or the like, a position detection device that outputs position information of each devices, and other devices.

The control bus 11 is a bus for control that connects between the plant manipulation monitoring device 200 and the FCS 210. The communication bus 12 is a bus for communication that connects between the plant manipulation monitoring device 200 and the plant operation support device 300. The gateway 15 performs a protocol conversion for transmitting data, which is transmitted from the control bus 11, to the communication bus 12.

Data of each field device in the plant 100, which has been collected by the FCS 210, is transmitted to the plant manipulation monitoring device 200 via the control bus 11 and is transmitted to the plant operation support device 300 via the control bus 11, the gateway 15, and the communication bus 12.

The plant operation support device 300 is a computer device that performs a simulation of operation of the plant 100 based on information obtained from the plant 100. For example, the plant operation support device 300 performs the simulation of the operation of the plant 100 based on the data of each field device in the plant 100 that is collected by the FCS 210. The operation to the plant operation support device 300 and the display of the simulation result by the plant operation support device 300 are performed by the plant manipulation monitoring device 200 connected via the communication bus 12.

(Composition of the Plant Operation Support Device 300)

Figure 2:
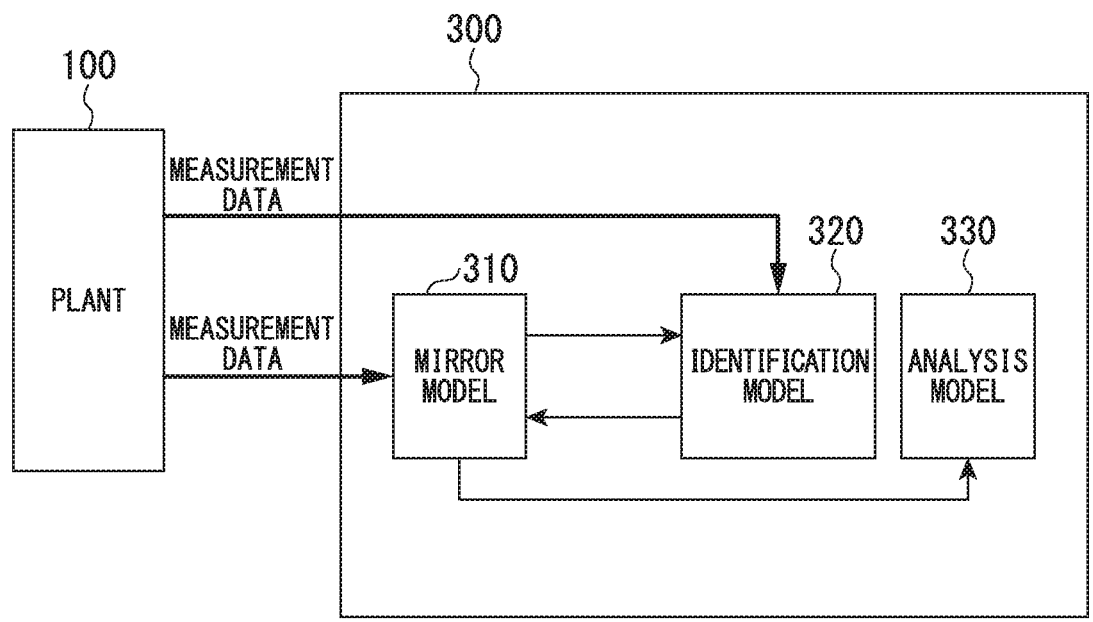
FIG. 2 is a block diagram showing an example of a schematic configuration of the plant operation support device in accordance with an embodiment of the present invention.

FIG. 2 is a block diagram showing an example of the schematic configuration of the plant operation support device 300. The plant operation support device 300 includes a mirror model 310, an identification model 320, and an analysis model 330. Each of the mirror model 310, the identification model 320, and the analysis model 330 is a functional configuration that is realized by running a control program, which is for realizing each function, in the plant operation support device 300.

The plant operation support device 300 obtains data (measurement data or the like) from the plant 100 via the FCS 210. The mirror model 310 operates in parallel synchronizing with the plant 100 and performs a simulation with obtaining data from the plant 100. Thereby, the mirror model 310 imitates the operation of the plant 100, estimates a state quantity that has not been measured in the plant 100, and visualizes inside the plant 100.

The identification model 320 periodically estimates performance parameter of devices based on the data obtained from the plant 100 so that the mirror model 310 corresponds to the measurement data of the plant 100.

The analysis model 330 performs a prediction of the future operating state of the plant 100 or the like based on the operation of the plant 100 that is imitated by the mirror model 310. For example, the analysis model 330 performs a stationary state prediction, a transient state prediction, a prevention diagnosis (anomaly diagnosis), or the like.

The stationary state prediction is a prediction of the operating state of the plant 100 after an infinite time has passed in a case in which the operation condition (setting value) of the plant 100 is changed, i.e., a prediction of a stationary state that is the final destination of the operating state. The analysis model 330 predicts the stationary state in a case in which the setting value is changed, referring the state indicating the present operation of the plant 100 as an initial state. For example, a case in which the stationary state prediction is applied to a distillation column of the plant 100 will be described. When a feed flow rate of the distillation column is reduced by 30% with respect to the initial state and a reflux ratio and a temperature setting value of the bottom of the column are made to be the same as the initial state, the analysis model 330 can predict the stationary state of concentration of impurity components that determines the quality of the product observed at the top of the column at the time of reaching the stationary state.

The transient state prediction is a prediction of a transitional operating state from the present to the future in a case in which the present operation condition (setting value) of the plant 100 is maintained or the operation condition (setting value) is changed from the present operation condition, i.e., a transient state prediction of the plant 100. For example, the analysis model 330 predicts the transient state of the plant 100 in a case in which the setting value is changed, referring the state indicating the present operation of the plant 100 as an initial state. Specifically, the analysis model 330 obtains the initial state of the operating state of the plant 100 from the mirror model 310, performs a prediction calculation on an analysis model, and generates a trend graph that is made from time series of the prediction result.

(Details of the Transient State Prediction)

Hereinafter, the transient state prediction performed by the transient state prediction part 333 will be described in detail.

Figure 3:
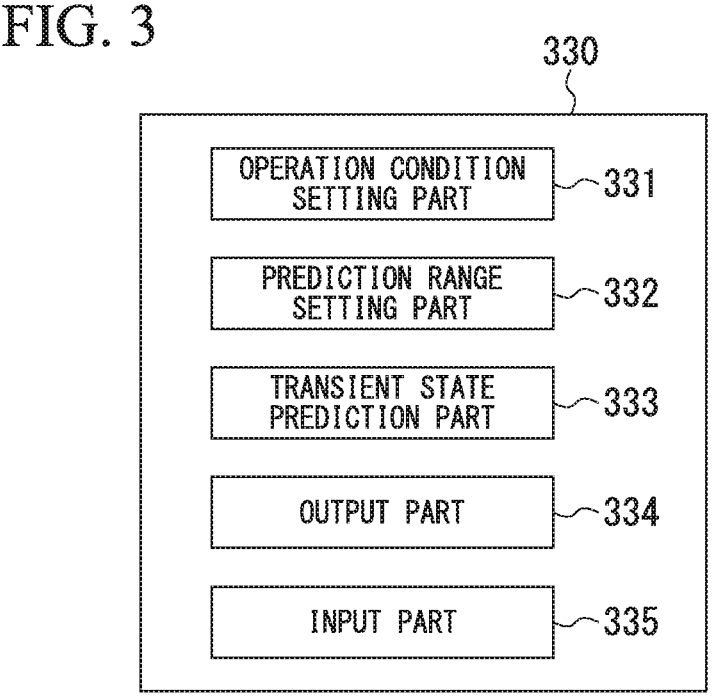
FIG. 3 is a diagram showing an example of a configuration of an analysis model regarding a prediction of a transient state in the plant operation support device in accordance with an embodiment of the present invention.

FIG. 3 is a diagram showing an example of the configuration of the analysis model 330 regarding the transient state prediction. The analysis model 330 includes an operation condition setting part 331, a prediction range setting part 332, a transient state prediction part 333, an output part 334, and an input unit 335.

The operation condition setting part 331 sets the operation condition of the plant 100 used for the transient state prediction. Moreover, the operation condition setting part 331 can also set the operation condition of the plant 100 and the timing at which the operation condition is applied. That is, the operation condition setting part 331 can set beforehand the operation condition changed at an arbitrary timing in the middle of the processing of the transient state prediction. Moreover, the operation condition setting part 331 may be configured to also set a plurality of operation conditions applied at different timings.

The prediction range setting part 332 sets the range of time when the transient state prediction of the plant 100 is performed (hereinafter referred to as a "prediction range"). For example, the prediction range setting part 332 sets a time from the present time (when the transient state prediction is started) until the transient state prediction ends as the prediction range.

The transient state prediction part 333 predicts the transient state of the plant 100 in the prediction range set by the prediction range setting part 332 based on the operation condition set by the operation condition setting part 331. For example, when the operation condition and the timing at which the operation condition is applied are set by the operation condition setting part 331, the transient state prediction part 333 predicts the transient state of the plant 100 in a case in which the set operation condition is applied at the timing at which the operation condition is applied. That is, the transient state prediction part 333 can change the operation condition at an arbitrary timing in the middle of the processing of the transient state prediction and continue the prediction. Moreover, when a plurality of operation conditions are set by the operation condition setting part 331, the transient state prediction part 333 predicts the transient state of the plant 100 in a case in which a plurality of operation conditions are applied at each timing.

Also, the transient state prediction part 333 generates the trend graph that is made from time series of the prediction result (simulation result) of the transient state predicted as described above.

The output part 334 outputs a screen (hereinafter referred to as a "condition setting screen") for receiving an input of the operation condition set by the operation condition setting part 331, an input of the prediction range set by the prediction range setting part 332, or the like, a screen (hereinafter referred to as a "prediction result display screen") for displaying the prediction result (simulation result) predicted by the transient state prediction part 333, or the like, to the plant manipulation monitoring device 200 via the communication bus 12. The outputted condition setting screen, the outputted prediction result display screen, or the like are displayed on the display part of the plant manipulation monitoring device 200.

Moreover, contents of the operation to the condition setting screen, the prediction result display screen, or the like which have been displayed on the display part of the plant manipulation monitoring device 200 are transmitted to the plant operation support device 300 from the plant manipulation monitoring device 200 via the communication bus 12.

The input unit 335 receives the contents of the operation transmitted from the plant manipulation monitoring device 200. For example, the operation condition setting part 331 sets the operation condition and the timing at which the operation condition is applied based on the contents of the operation to the condition setting screen. Moreover, the prediction range setting part 332 sets the prediction range based on the contents of the operation on the condition setting screen.

(Example of the Processing of the Transient State Prediction)

Figure 4:
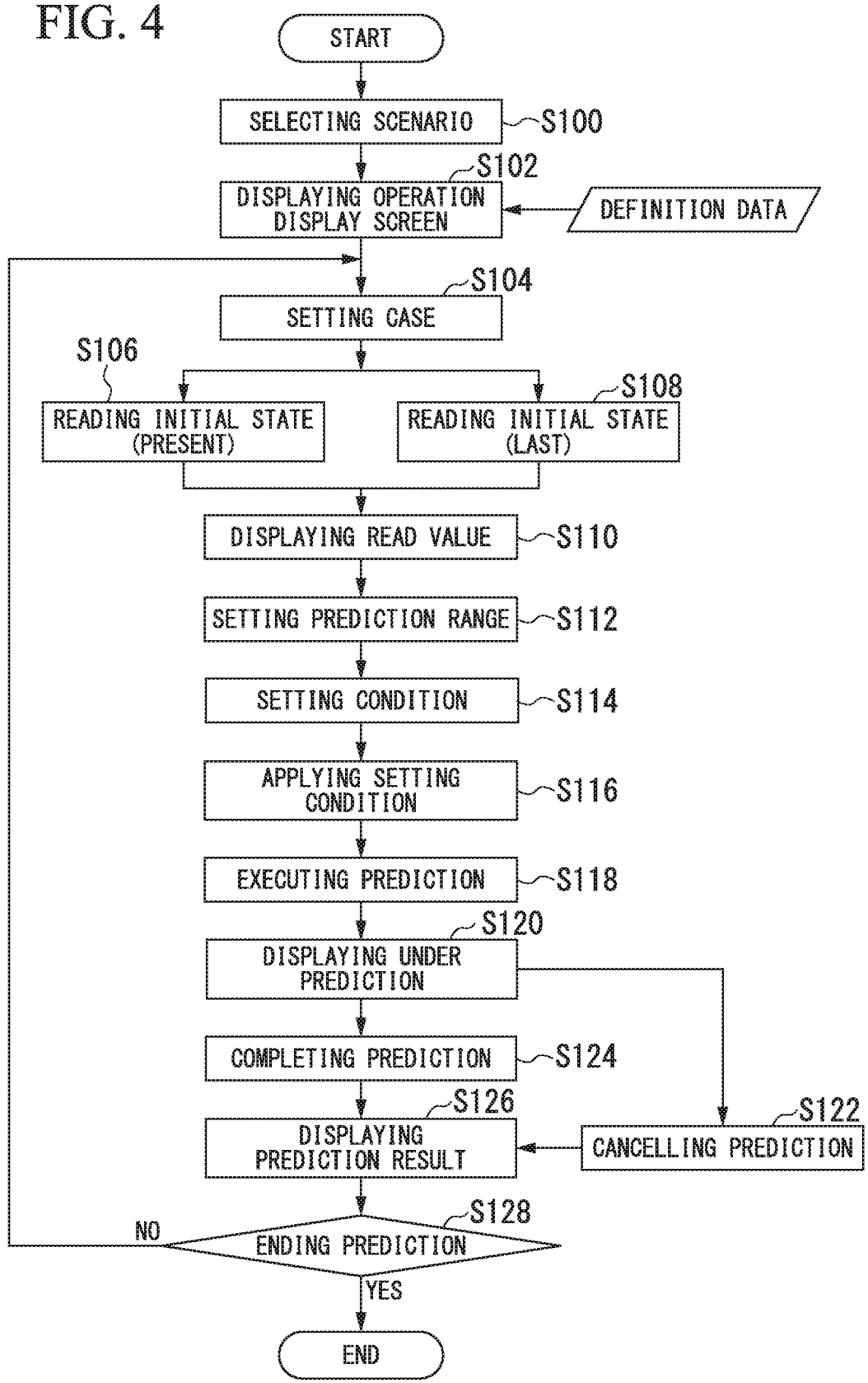
FIG. 4 is a flow chart showing an example of a processing of the transient state prediction in the plant operation support device in accordance with an embodiment of the present invention.

Next, an example of the processing of the transient state prediction performed by the analysis model 330 will be described with reference to FIG. 4 to FIG. 9. FIG. 4 is a flow chart showing an example of the processing of the transient state prediction in accordance with the present embodiment. Moreover, FIG. 5 to FIG. 9 are figures showing examples of the display screen displayed in the processing of the transient state prediction.

The transient state prediction can be performed in accordance with every scenario. The scenario indicates a classification for the operating purpose by a user. For example, the scenario may be a scenario for switching a brand, a scenario for changing the quantity of production, or the like. In the processing of the transient state prediction, at first, the analysis model 330 displays a scenario selection screen (Step S100 of FIG. 4).

Figure 5:
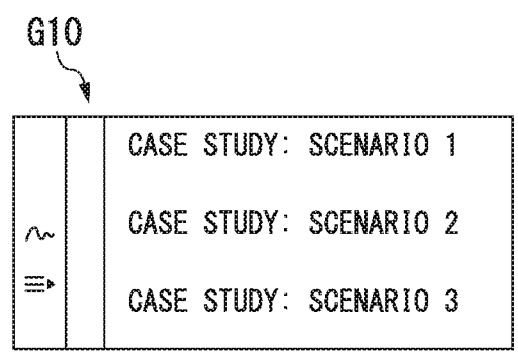
FIG. 5 is a diagram showing an example of a display of a scenario selection screen displayed in the processing of the transient state prediction in the plant operation support device in accordance with an embodiment of the present invention.

FIG. 5 is a diagram showing an example of a display of the scenario selection screen. A plurality of scenarios are displayed on the scenario selection screen G10 so as to be capable of being selected as an example (case study) that performs the transient state prediction. The user can select a scenario for purpose from among the scenarios.

If a scenario is selected in the scenario selection screen G10, the analysis model 330 makes display the condition setting screen of the selected scenario. Here, in each scenario, only a tag that can change the operation condition of the scenario is registered. The tag is information which shows a control target in the plant 10. Since the tags exist innumerably, a big labor is needed for selecting and setting a tag from among the plurality of tags. In the present embodiment, by using a scenario in which a tag that can change the operation condition is defined beforehand, the complicated nature of a user's operation is eliminated and operability is improved.

For example, a combination of each scenario and a tag that can change the operation condition of the scenario is registered in the analysis model 330 beforehand as definition data. The analysis model 330 generates and displays the operation display screen including the condition setting screen on which the operation condition of the tag, which can be changed in the selected scenario, can be set with reference to the definition data (Step S102 of FIG. 4).

Figure 6:
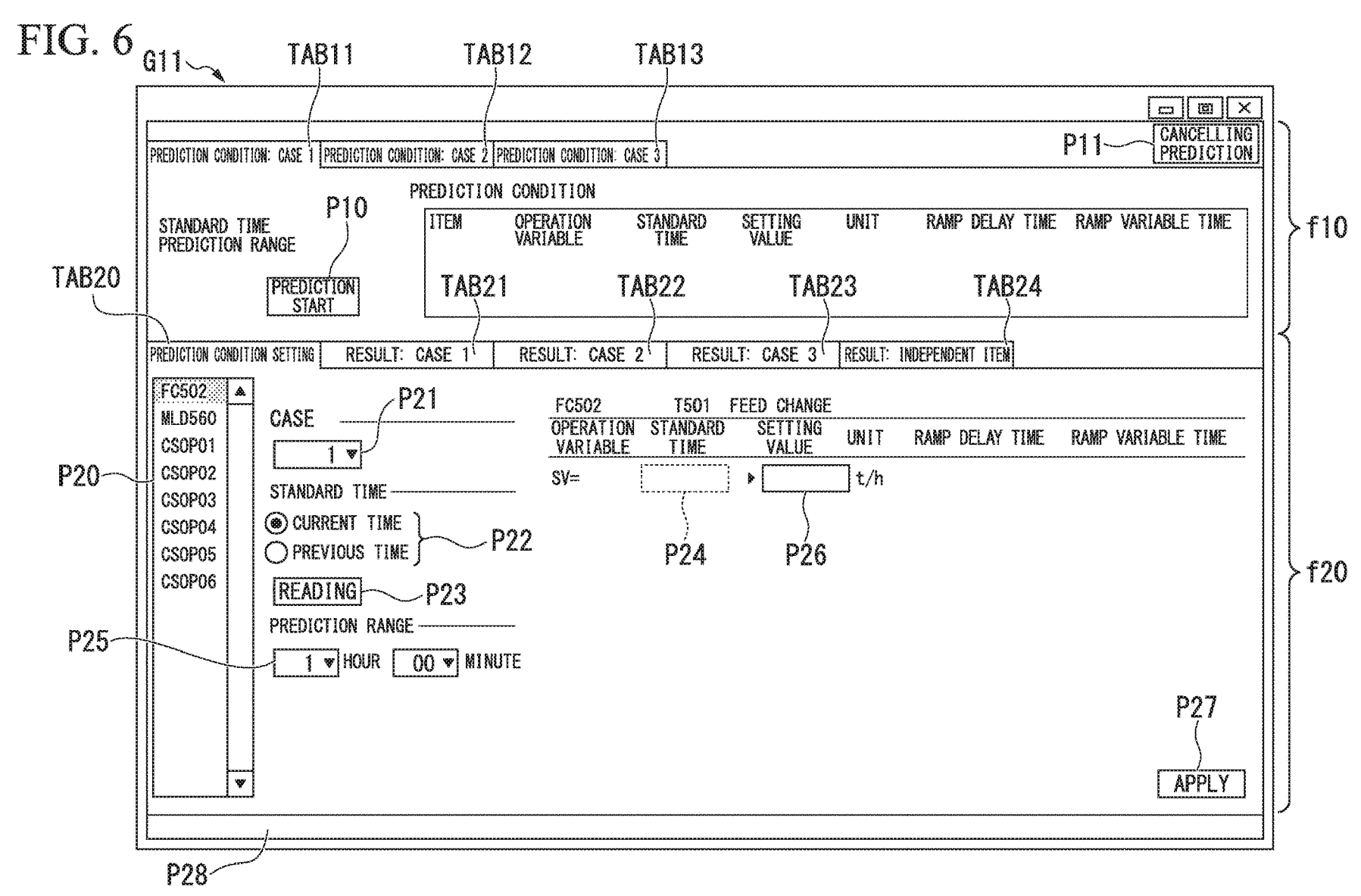

FIG. 6 is a diagram showing an example of a display of the operation display screen including the condition setting screen. In the operation display screen G11, the condition setting screen is displayed in the area indicated by the mark f20 (lower berth of the screen) on which the operation condition for performing the transient state prediction can be set. On the other hand, the setting contents screen is displayed in the area indicated by the mark f10 (upper row of the screen) on which the contents of the setting of the operation condition set in the condition setting screen are displayed.

In addition, in the area indicated by the mark f20, the display of the condition setting screen and the display of the prediction result display screen can be switched by tabs TAB20 to TAB24. The tab TAB20 is a tab for displaying the condition setting screen. In the present embodiment, the operation condition of at most three cases (cases 1, 2, and 3) can be set in the condition setting screen.

On the other hand, the tabs TAB21 to TAB24 are tabs that makes display the prediction result display screen on which the prediction result of the transient state prediction in the operation condition set by the condition setting screen is displayed. The prediction result display screen can be displayed for every case. Each of the tabs TAB21, TAB22 and TAB23 is a tab on which each prediction result display screen of case 1, case 2 and case 3 is displayed. Moreover, the tab TAB24 is a tab that makes display the prediction result display screen on which three prediction results of cases 1, 2 and 3 are summarized and displayed so that comparison is possible.

Here, the tab TAB20 (prediction condition setting) for making display the condition setting screen is selected. Moreover, the tag, which can change the operation condition using the scenario selected based on the combination of the scenario and the tag which are registered in the definition data beforehand, is displayed on the tag list P20 so as to be capable of being selected.

On the condition setting screen, setting of a standard time, a prediction range, and an operation condition is performed by a user's operation for every case. For example, in the example shown in FIG. 6, three cases 1, 2, and 3 can be set and the standard time, the prediction range, and the operation condition can be arbitrarily set for every case. Thereby, the prediction results of the transient state for three cases in which the operation condition is changed can be predicted and compared.

First, either one case is selected from among cases 1, 2, and 3 by an operation of the user to the pull down menu P21 of FIG. 6. Here, case 1 is selected and the analysis model 330 sets the operation condition of case 1 (Step S104 of FIG. 4).

Next, either of the present time and previous time is selected by an operation of the user to the radio button P22 of FIG. 6 as a standard time for performing the transient state prediction. The present time is selected when the present operating state of the plant 100 is made to be an initial state. On the other hand, the previous time is selected when the operating state of the previous standard time is made to be an initial state. In addition, only the present time can be selected in the first setting, while, if the transient state prediction is performed once, the previous time can also be selected in the second setting and afterwards.

For example, in a state in which the present time is selected, if the reading button P23 of FIG. 6 is pushed, the analysis model 330 will read from the mirror model 310 the operating state at the timing when the reading button P23 is pushed and change the operating state to be an initial state (Step S106 of FIG. 4). On the other hand, in a state in which the previous time is selected, if the reading button P23 of FIG. 6 is pushed, the analysis model 330 will read the initial state used by the previous (just before) transient state prediction (Step S108 of FIG. 4).

Moreover, if the reading button P23 is pushed, "under reading" is displayed on the status bar P28 of the lower part of the operation display screen G11. If the initial state is obtained, "standard value reading completion" is displayed on the status bar P28 of the lower part of the operation display screen G11.

If the operating state of the standard time has been read, the analysis model 330 reflects the read value on the standard time value of the condition setting screen (Step S110 of FIG. 4). In the example shown in FIG. 6, the reading value of SV (Set Value) of the tag selected from the tag lists P20 is displayed as the standard time value in the area indicated by the mark P24. Here, the tag "FC502" is selected from the tag lists P20. The tag "FC502" is, for example, a tag for changing a feeding flow.

Next, the time of the prediction range is set by operation of the user on the pull down menu P25 of FIG. 6. The analysis model 330 sets the prediction range (here, 1 hour and 00 minutes), which has been set by the user, as the prediction range in which the transient state prediction is preformed (Step S112 of FIG. 4).

Then, the user inputs into the input box P26 the setting value of SV of the selected tag, i.e., the operation condition in which the transient state prediction is performed. The analysis model 330 sets the setting value of SV inputted by the user as a condition used in the transient state prediction (Step S114 of FIG. 4).

In addition, in the condition setting screen, each item, which has been set so far, is in a state of being set on the screen and is registered as a setting of the operation condition of one case when the application button P27 of FIG. 6 is pushed. For example, when all conditions are set and the application button P27 is pushed, the analysis model 330 registers the initial state (here, the operating state of the present time) at the standard time, the prediction range (here, 1 hour and 00 minutes), and the setting value of SV as a setting of the operation condition of the selected case (here, case 1). Thereby, the set conditions are applied as the prediction conditions (Step S116 of FIG. 4).

Moreover, if a setting of the operation condition of the selected case (here, case 1) is registered by the application button P27 being pushed, the registered setting contents is displayed on the setting contents screen in the area indicated by the mark f10 of FIG. 6. On the setting contents screen, display of each setting contents of cases 1, 2, and 3 can be switched by the tabs TAB11 to TAB13.

In addition, when changing the registered contents, if the setting contents to be changed are selected on the setting contents screen, the selected setting contents are re-displayed on the condition setting screen and it becomes possible to change the setting. When the setting has been changed, the changed setting is registered by depressing the application button P27 again. Moreover, when eliminating the registered setting contents, it is possible to eliminate the registered setting contents by selecting the setting contents to be eliminated on the setting contents screen and selecting "deletion" from a right-click menu of an operation mouse, or the like.

Moreover, if the registered setting contents are displayed on the setting contents screen, the prediction start button P10 in the setting contents screen will become valid and it becomes possible to operate the prediction start button P10. In addition, if at least one of the registered contents is reflected on the setting contents screen, the prediction start button P10 will become valid. If the prediction start button P10 is pushed, the analysis model 330 will perform the transient state prediction of the prediction conditions (here, conditions set in case 1) of the registered setting contents (Step S118 of FIG. 4).

Figure 7:
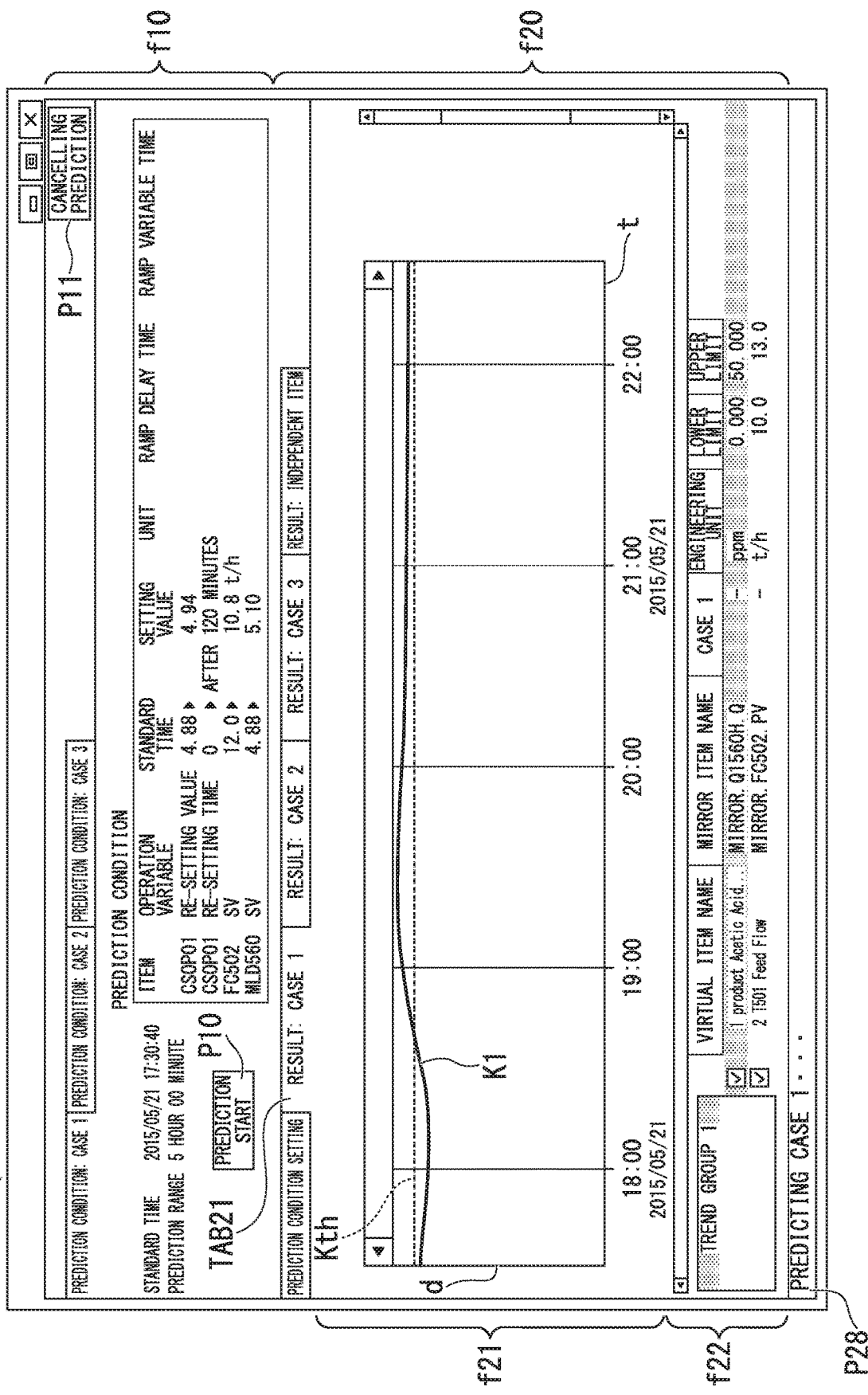
FIG. 7 is a diagram showing an example of a display of the operation display screen during execution of the transient state prediction in the plant operation support device in accordance with an embodiment of the present invention.

Next, if the transient state prediction is performed, the analysis model 330 displays the operation display screen G12 shown in FIG. 7 during execution of the prediction (Step S120 of FIG. 4). FIG. 7 is a diagram showing an example of the operation display screen G12 during execution of the prediction. In the operation display screen G12 during execution of the prediction, the prediction result display screen, which displays the result of the prediction while updating as required, is displayed on the area indicated by the mark f20 (the lower berth of the screen). Here, the tab TAB21 is selected and the prediction result display screen of case 1 is displayed. Moreover, "under prediction of case 1" is displayed on the status bar P28 in the lower part of the operation display screen G12 during execution of the prediction. If the prediction is completed, "prediction of case 1 is completed" is displayed on the status bar P28 of the lower part of the operation display screen G12.

The trend graph that is made from time series of the prediction result of the transient state is displayed on the area indicated by the mark f21 in the prediction result display screen displayed on the area indicated by the mark f20. In the trend graph, the horizontal axis t is a time-axis (date and time) and the vertical axis d is a data value axis. Moreover, the left end of the horizontal axis t is the standard time. The predictive value K1 of the trend graph expresses the trend of the prediction result in case 1. The predictive value K1 is less than the limit Kth for a while from the standard time, but is over the limit Kth from the middle. That is, the trend graph shows that the operation conditions used as the predictive value K1 are conditions which are not desirable.

Moreover, the virtual item selection screen on which the virtual item displayed on the trend graph can be selected is displayed on the area indicated by the mark f22 (below the trend graph). The virtual item corresponds to the tag used in the plant operation support device 300. A plurality of virtual items selected by the check box may be displayed on the trend graph.

Moreover, during execution of the transient state prediction, the prediction start button P10 becomes invalid, and the prediction stop button P11 becomes valid. If the prediction stop button P11 is pushed, the analysis model 330 stops the transient state prediction under execution (Step S122 of FIG. 4). And in the operation display screen G12 shown in FIG. 7, the analysis model 330 displays the intermediate prediction result until the transient state prediction is stopped (Step S126 of FIG. 4). At this time, the prediction stop button P11 becomes invalid, and the prediction start button P10 becomes valid.

On the other hand, when the transient state prediction which has been under execution at Step S120 of FIG. 4 is completed to the end of the set prediction range (Step S124 of FIG. 4), the analysis model 330 makes display the prediction result display screen, of which the transient state prediction is completed to the last, in the operation display screen G12 shown in FIG. 7 (Step S126 of FIG. 4).

Next, the analysis model 330 determines whether the transient state prediction was ended by a user's operation (Step S128 of FIG. 4). If the transient state prediction was ended (YES), the analysis model 330 ends the processing of the transient state prediction. On the other hand, if the prediction of following cases is performed succeedingly without ending the transient state prediction (NO), the processing returns to Step S104 of FIG. 4. Then, in the operation display screen G11 (refer to FIG. 6) on which the condition setting screen is displayed, the analysis model 330 sets the operation condition of the selected case by operation of the user on the pull down menu P21.

Thus, the analysis model 330 can perform the transient state prediction for at most three cases. In addition, although it is considered as three cases in the present embodiment, it is not limited to three cases.

Figure 8:
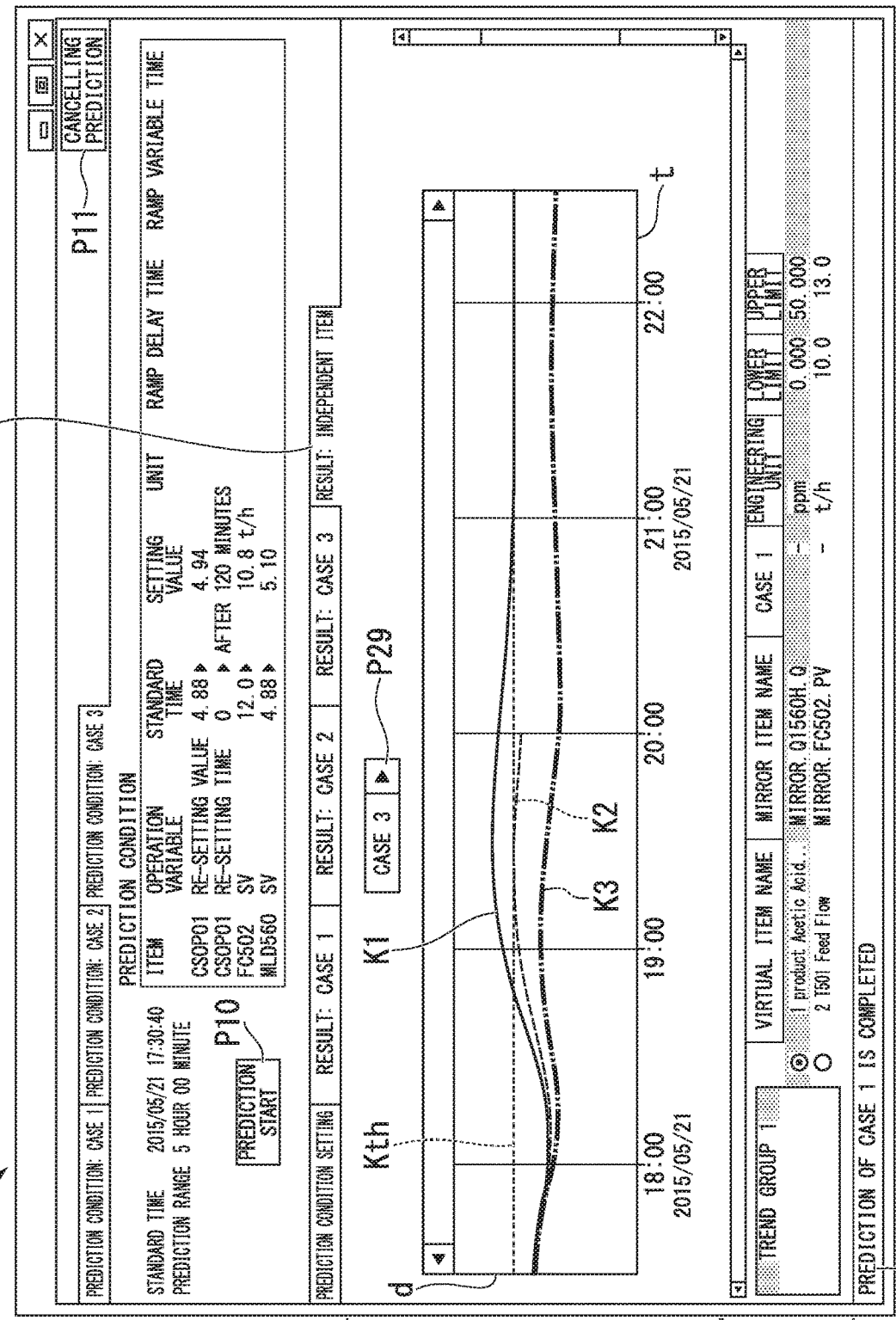
FIG. 8 is a diagram showing an example of a display of the operation display screen displaying a prediction result display screen in the processing of the transient state prediction in the plant operation support device in accordance with an embodiment of the present invention.

Here, other examples of the prediction result display screen will be described with reference to FIG. 8. The operation display screen G13 shown in FIG. 8 is an example in which the prediction result display screen is displayed when the tab TAB24 is selected. In the prediction result display screen, the prediction result of cases 1, 2, and 3 can be summarized to be displayed for every virtual item so that comparison is possible. For example, it is the prediction result of one virtual item that can be displayed on the trend graph at this time. In the virtual item selection screen displayed on the area indicated by the mark f22 (below the trend graph), selection of a plurality of virtual items is possible by a check box in FIG. 7, while selection of only one virtual item is possible by a radio button in FIG. 8. Moreover, the pull down menu P29 of the upper part of the trend graph can select a case, and the trend of the predictive value of the selected case is emphatically displayed. Moreover, since the prediction range is arbitrarily changeable in three cases, when the prediction ranges differ in three cases, the starting point (standard time) of the horizontal axis t begins from the most past standard time (prediction start time) in the three cases, and the ending point of the horizontal axis t serves as the time when the completion time of the prediction is the latest among the three cases.

In the example of the prediction result display screen shown in FIG. 8, as for the selected virtual item, the predictive value K1, which indicates the trend of the prediction result in case 1, the predictive value K2, which indicates the trend of the prediction result in case 2, and the predictive value K3, which indicates the trend of the prediction result in case 3, are respectively displayed on the trend graph. The predictive value K1 in case 1 is an example in which the data value is over the limit Kth in the transient state in the middle of the processing of the first transient state prediction, for example. The predictive value K2 in case 2 is an example in which the operation condition is set based on the first prediction result so that data value might fall rather than the predictive value K1, but since the data value has exceeded the limit Kth a little on the way, the prediction is stopped in the middle of the processing of the transient state prediction.

The case 1 and case 2 are predictions of the transient state in a case in which the plant 100 is operated from the standard time by the operation conditions set in the operation display screen G11 shown in FIG. 6. In the present embodiment, the operation condition may be changed at an arbitrary timing in the middle of the processing of the transient state prediction and the prediction may be continued. That is, by changing the operation condition in the middle of the processing of the transient state prediction, it is possible to perform the simulation of the operation condition in which the marginal operation, which is aimed at an operation just before a limit, is possible without exceeding the limit in both of the transient state and the stationary state.

The predictive value K3 in case 3 is an example of the prediction result in a case in which the operation condition is changed in the middle of the processing of the transient state prediction. In the example of the figure, the transient state prediction is performed on the condition on which the tag "CSOP01", which changes the reflux ratio after a definite period of time, is changed 120 minutes after the standard time into a re-setting value 4.94. The predictive value K3 is within the prediction range and does not exceed the limit Kth, stabilized without exceeding the limit Kth even in the stationary state. Therefore, it can be said that the predictive value K3 is the most desirable operation condition in this case.

(The condition setting method in a case in which the operation condition is changed in the middle of the processing of the transient state prediction)

Figure 9:
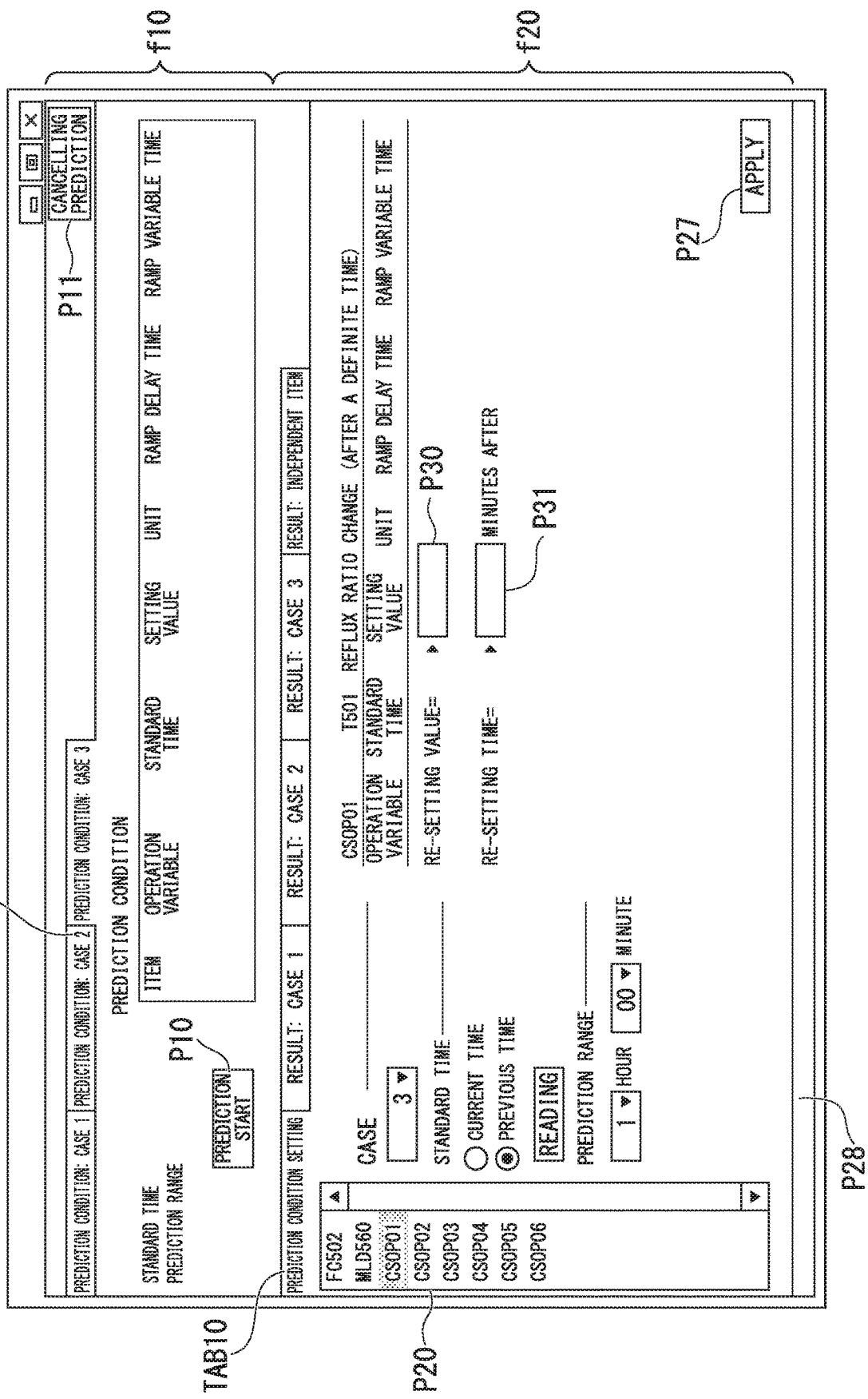
FIG. 9 is a diagram showing an example of a display of the operation display screen in a case in which the operation condition is changed in the middle of the processing of the transient state prediction in the plant operation support device in accordance with an embodiment of the present invention.

Next, the condition setting method in a case in which the prediction is performed by changing the operation condition in the middle of the processing of the transient state prediction will be described. FIG. 9 is a diagram showing an example of the operation display screen in a case in which the operation condition is changed in the middle of the processing of the transient state prediction. In the operation display screen G14 shown in FIG. 9, the tag for changing the operation condition in the middle of the processing of the transient state prediction is selected from the tag list P20 on the condition setting screen currently displayed in the area indicated by the mark f20. The tag for changing the operation condition in the middle of the processing of the transient state prediction is a tag which can set the operation condition and the timing at which the operation condition is applied.

In the example of the figure, the tag "CSOP01" is selected from the tag lists P20. As described above, "CSOP01" is a tag for changing the reflux ratio after a definite period of time. The setting value (re-setting value), which is changed in the middle of the processing of the transient state prediction, is inputted into the input box P30, and the timing (re-set period) at which the setting value is applied is inputted into the input box P31.

In addition, "CSOP01" to "CSOP06" in the tag list P20 are tags for changing the operation condition in the middle of the processing of the transient state prediction. It is also possible to select each of "CSOP01" to "CSOP06" and input the re-setting value and the re-set period for each tag. That is, it is also possible to set a plurality of operation conditions offered at different timing.

For example, in Step S114 of the processing of the transient state prediction shown in FIG. 4, if a re-setting value and a re-set period are inputted into each of the input box P30 and the input box P31 by a user, the analysis model 330 will set the inputted re-setting value and the inputted re-set period as conditions used in the transient state prediction.

Then, if the application button P27 is pushed, the analysis model 330 will register the inputted re-setting value and inputted the re-set period as prediction conditions for case 2 (Step S116 of FIG. 4). Then, if the prediction start button P10 is pushed, the analysis model 330 will perform the transient state prediction using the conditions (here, conditions set in case 2) of the registered setting contents (Step S118 of FIG. 4).

Thus, the plant operation support device 300 in accordance with the present embodiment includes the operation condition setting part 311 and the transient state prediction part 333. The operation condition setting part 311 sets the operation condition of the plant 100 and the timing at which the operation condition is applied. The transient state prediction part 333 predicts the transient state (transitional operating state) of the plant 100 from the specific time (for example, standard time) to the future in a case in which the operation condition of the plant 100 set by the operation condition setting part 331 is applied at the above-described timing.

Thereby, since the plant operation support device 300 can change the operation condition in the middle of the processing of the transient state prediction and continue the prediction, it is possible to efficiently perform the simulation of the operation condition in a case in which the marginal operation of the plant 100 is performed.

Moreover, the operation condition setting part 331 can set a plurality of operation conditions of the plant 100 applied at different timings. Also, the transient state prediction part 333 predicts the transient state (transitional operating state) of the plant 100 in a case in which a plurality of operation conditions are applied at each of the above-described timings when a plurality of operation conditions are set by the operation condition setting part 331.

Thereby, the plant operation support device 300 can easily perform the prediction in which the operation condition is changed more finely in the middle of the processing of the transient state prediction.

Moreover, the plant operation support device 300 includes the prediction range setting part 332 which sets the range of time to predict the transitional operating state (prediction range). Also, the transient state prediction part 333 predicts the transient state (transitional operating state) of the plant 100 during the prediction range set by the prediction range setting part 332.

Thereby, the plant operation support device 300 can predict the transient state in a suitable range of time according to the character of the parameter of the control target of the plant 100. For example, since the process variable observed according to the conditions has various damping time constants after the operation condition is changed, the time required for the prediction differs when the prediction is performed. Therefore, the plant operation support device 300 enables the user to easily set the range of time when the prediction is performed. This, the plant operation support device 300 can predict the transient state in the range of time that is suitable for every case.

Moreover, in order to perform the marginal operation, it is necessary to make a decision after performing a plurality of examinations in the case. Therefore, it is required to be capable of seeing the detailed data for every case and performing detailed comparison between cases.

Then, in the plant operation support device 300, the operation condition setting part 331 sets the input of the operation condition of the plant 100 and the timing at which the operation condition is applied for each of the plurality of cases. Also, the transient state prediction part 333 predicts the transient state (transitional operating state) of the plant 100 for every case. Thereby, the plant operation support device 300 can compare the transient states predicted in a plurality of operation conditions. Therefore, the user can determine the operation condition for performing the marginal operation after performing a plurality of examinations in the case.

Also, the transient state prediction part 333 generates each of the prediction result of the transient state (transitional operating state) for every case as graph information divided for every case. Moreover, the transient state prediction part 333 generates each of the prediction result of the transient state (transitional operating state) for every case as graph information summarized to one. Thereby, the plant operation support device 300 makes it possible to see the detailed data for every case or perform a detailed comparison between cases. Therefore, the transient state prediction part 333 can satisfy any needs of the user for the detailed display for every case and the comparison display between cases when the operation condition is determined.

Moreover, in the present embodiment, a scenario which indicates the operation to the plant 100 is set beforehand. Specifically, a plurality of scenarios are set beforehand on which a predetermined tag that indicates the control target in the plant is registered. Also, the operation condition setting part 311 sets the operation condition of the predetermined tag registered in the scenario selected from the plurality of scenarios and the timing at which the operation condition is applied according to a user's operation input. For example, the plant operation support device 300 in accordance with the present embodiment displays the scenario selection screen G10 (refer to FIG. 5) on which a plurality of scenarios are displayed which can be selected as an example (case study) of performing the transient state prediction. Also, the operation condition setting part 311 sets the operation condition of the predetermined tag registered in the selected scenario and the timing at which the operation condition is applied according to a user's operation input (input to the re-setting value and the re-set period) on the operation display screen G14 shown in FIG. 9. Moreover, the transient state prediction part 333 predicts the transient state (transitional operating state) in a case in which the operation condition of the predetermined tag registered on the selected scenario is applied at the above-described timing.

Thereby, the plant operation support device 300 makes it possible to change the condition of the tag related to the scenario and display the prediction result of the transient state, by the user selecting the scenario for purpose from the list of scenarios displayed on the scenario selection screen G10. Thus, the plant operation support device 300 makes it possible to set the operation condition of the tag using the scenario according to the purpose without a big labor of selecting and setting a tag from among the tags which exist innumerably. Therefore, the complicated nature of a user's operation is eliminated and operativity is improved.

In addition, programs implementing a process by the respective elements within the above-described plant operation support device 300 may be recorded on a computer readable recording medium, and the program recorded in the recording medium may be read into and executed by a computer system to perform the above-described various processes of the plant operation support device 300 in accordance with the present embodiment. Here, the "computer system" may include the hardware such as an OS, peripheral equipment, or the like included in the plant operation support device 300.

Moreover, some or all of the plant operation support device 300 in the above-described embodiment may be realized as integrated circuits such as LSI (Large Scale Integration) or the like. Each functional block of the plant operation support device 300 may be made of a processor individually or may be made of a processor by accumulating part or all of the functional block.

Moreover, the technique of making an integrated circuit may be realized not only by LSI but by a dedicated circuit or a general-purpose processor. Moreover, if a technology of making an integrated circuit that substitutes LSI may appear by the progress of the semiconductor technology, the integrated circuit using that technology may be used.

While preferred embodiments of the present invention have been described and illustrated above, it should be understood that these are examples of the present invention and are not to be considered as limiting. Additions, omissions, substitutions, and other modifications can be made without departing from the scope of the present invention. For example, each function described in the above-described embodiment is arbitrarily combinable.

In addition, the display mode of the trend graph of the prediction result of the transient state shown in FIG. 7 and FIG. 8 is an example, and the present invention is not restricted to this. For example, although the boundary of the limit Kth is denoted by the dashed line in FIG. 7 and FIG. 8, the boundary of the limit Kth may be described with changing a color, light and darkness, or the like between the area which does not exceed the limit Kth and the area which exceeds the limit Kth. Moreover, the display mode of the predictive value (for example, predictive values K1, K2, and K3) may be changed between a period when the prediction is performed and a period after the prediction is completed (including after the prediction is stopped). For example, "during prediction" may be denoted by a dashed line, "after completion of prediction" may be denoted by a solid line. "during prediction" may be denoted by a blink display, and "after completion of prediction" may be denoted by a continuous display.

In the above description of the embodiment, a configuration example in which operations for the plant operation support device 300 and the display of the simulation results by the plant operation support device 300 were performed at the plant manipulation monitoring device 200 connected via the communication bus 12, but the present invention is not limited thereto. For example, the operations for the plant operation support device 300 and the display of the simulation results by the plant operation support device 300 may be performed by the plant operation support device 300. Also, the operations for the plant operation support device 300 and the display of the simulation results by the plant operation support device 300 may be performed by a portable information terminal device connected via the communication bus 12.

As used herein, the following directional terms "forward, rearward, above, downward, right, left, vertical, horizontal, below, transverse, row and column" as well as any other similar directional terms refer to those directions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to perform the desired function.

Moreover, terms that are expressed as "means-plus function" in the claims should include any structure that can be utilized to perform the function of that part of the present invention.

The term "part" is used to describe a component, unit or part of a hardware and/or software that is constructed and/or programmed to perform the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A plant operation support device for predicting a concentration of components that determines quality of a product to be produced in a plant by a simulation based on measurement data obtained from a field device arranged in the plant, comprising:
   at least one memory storing instructions, and
   at least one processor configured to execute the instructions to:

operate in parallel synchronizing with the plant and perform a simulation with obtaining the measurement data from the field device to estimate a state quantity that has not been measured in the plant;

estimate periodically performance parameter of devices used for the estimation of the state quantity based on the measurement data obtained from the field device;

set beforehand a plurality of operation conditions of the plant in a case in which the plant is operated near a limit of a product specification of the product and a plurality of timings for applying each of the plurality of operation conditions, the plurality of operation conditions being setting values relating to control of the plant;

predict, based on the estimated state quantity, a transient state of the plant from a specific time point to a future time point by the simulation in a case in which the plurality of operation conditions set beforehand are applied at the plurality of timings, the specific time point being selectable between a present time and a previous time when a previous transient state prediction is performed, a present operating state being made to be an initial state in a case in which the present time is selected, an operating state used by the previous transient state prediction being made to be an initial state in a case in which the previous time is selected;

set a re-setting value input by a user as at least one of the plurality of operation conditions at a timing input by the user in the middle of one processing of the transient state prediction and continue the one processing of the transient state prediction;

predict, by the simulation based on the estimated state quantity, a stationary state that is a final destination of an operating state of the plant in a case where the plurality of operation conditions set beforehand are applied at the plurality of timings, generate a trend graph that is made from time series of a prediction result of the concentration in the transient state and the stationary state; and display the generated trend graph and the limit of the product specification of the product in a screen.

2. The plant operation support device according to claim 1, wherein the at least one processor is further configured to:
   set a time range when the transient state is predicted; and
   predict the transient state in the set time range.

3. The plant operation support device according to claim 1, wherein the at least one processor is further configured to:
   set the plurality of operation conditions of the plant and the plurality of timings for applying the each of the plurality of operation conditions for each of a plurality of cases, and
   predict the transient state for each of the plurality of cases.

4. The plant operation support device according to claim 3, wherein the at least one processor is further configured to:
   generate a plurality of trend graphs, which are different between each of the plurality of cases, from each prediction result of the transient state corresponding to each of the plurality of cases.

5. The plant operation support device according to claim 3, wherein the at least one processor is further configured to:
   generate a combined trend graph from each prediction result of the transient state corresponding to each of the plurality of cases.

6. The plant operation support device according to claim 1, wherein
a plurality of scenarios are previously set, each of which indicates an operation to the plant and registers a predetermined tag indicating a control target in the plant, and
the at least one processor is further configured to:
set an operation condition of the predetermined tag, which is registered in a scenario selected from the plurality of scenarios, and a timing for applying the operation condition in accordance with an operation input by the user; and
predict the transient state in a case in which the operation condition of the predetermined tag, which is registered in a scenario selected from the plurality of scenarios, is applied at the timing.

7. The plant operation support device according to claim 1, wherein
the plant operation support device is for predicting a concentration of impurity components that determines the quality of the product to be produced in the plant by a simulation based on measurement data of a feed flow rate of a distillation column obtained from the field device arranged in the distillation column in the plant,
the at least one processor is configured to:
operate in parallel synchronizing with the plant and perform a simulation with obtaining the feed flow rate from the field device to estimate the concentration of impurity components that has not been measured in the plant;
estimate periodically the performance parameter of devices used for the estimation of the concentration of impurity components based on the feed flow rate obtained from the field device;
predict the transient state by the simulation based on the estimated concentration of impurity components; and
predict the stationary state by the simulation based on the estimated concentration of impurity components.

8. A plant operation support method using a plant operation support device, having a processor and memory, for predicting a concentration of components that determines quality of a product to be produced in a plant by a simulation based on measurement data obtained from a field device arranged in the plant, comprising:
operating with said processor in parallel synchronizing with the plant and performing with said processor a simulation with obtaining the measurement data from the field device to estimate a state quantity that has not been measured in the plant;
estimating periodically with said processor performance parameter of devices used for the estimation of the state quantity based on the measurement data obtained from the field device;
setting beforehand with said processor a plurality of operation conditions of the plant in a case in which the plant is operated near a limit of a product specification of the product and a plurality of timings for applying each of the plurality of operation conditions, the plurality of operation conditions being setting values relating to control of the plant;
predicting with said processor, based on the estimated state quantity, a transient state of the plant from a specific time point to a future time point by the simulation in a case in which the plurality of operation conditions that have been set beforehand are applied at the plurality of timings, the specific time point being selectable between a present time and a previous time when a previous transient state prediction is performed, a present operating state being made to be an initial state in a case in which the present time is selected, an operating state used by the previous transient state prediction being made to be an initial state in a case in which the previous time is selected;
setting with said processor a re-setting value input by a user as at least one of the plurality of operation conditions at a timing input by the user in the middle of one processing of the transient state prediction and continuing the one processing of the transient state prediction;
predict, by the simulation based on the estimated state quantity, a stationary state that is a final destination of an operating state of the plant in a case where the plurality of operation conditions set beforehand are applied at the plurality of timings,
generating with said processor a trend graph that is made from time series of a prediction result of the concentration in the transient state and the stationary state; and
displaying the generated trend graph and the limit of the product specification of the product in a screen.

9. The plant operation support method according to claim 8, wherein
the plant operation support method is for predicting a concentration of impurity components that determines the quality of the product to be produced in the plant by a simulation based on measurement data of a feed flow rate of a distillation column obtained from the field device arranged in the distillation column in the plant,
the plant operation support method comprises:
operating in parallel synchronizing with the plant and performing a simulation with obtaining the feed flow rate from the field device to estimate the concentration of impurity components that has not been measured in the plant;
estimating periodically the performance parameter of devices used for the estimation of the concentration of impurity components based on the feed flow rate obtained from the field device;
predicting the transient state by the simulation based on the estimated concentration of impurity components; and
predicting the stationary state by the simulation based on the estimated concentration of impurity components.

10. A non-transitory computer-readable storage medium storing a program for causing a computer of a plant operation support device for predicting a concentration of components that determines quality of a product to be produced in a plant by a simulation based on measurement data obtained from a field device arranged in the plant to execute:
operating in parallel synchronizing with the plant and performing a simulation with obtaining the measurement data from the field device to estimate a state quantity that has not been measured in the plant;
estimating periodically performance parameter of devices used for the estimation of the state quantity based on the measurement data obtained from the field device;
setting beforehand a plurality of operation conditions of the plant in a case in which the plant is operated near a limit of a product specification of the product and a plurality of timings for applying each of the plurality of operation conditions, the plurality of operation conditions being setting values relating to control of the plant;
predicting, based on the estimated state quantity, a transient state of the plant from a specific time point to a future time point by a simulation in a case in which the plurality of operation conditions that have been set beforehand are applied at the plurality of timings, the specific time point being selectable between a present time and a previous time when a previous transient state prediction is performed, a present operating state being made to be an initial state in a case in which the present time is selected, an operating state used by the previous transient state prediction being made to be an initial state in a case in which the previous time is selected;

setting a re-setting value input by a user as at least one of the plurality of operation conditions at a timing input by the user in the middle of one processing of the transient state prediction and continuing the one processing of the transient state prediction;

predict, by the simulation based on the estimated state quantity, a stationary state that is a final destination of an operating state of the plant in a case where the plurality of operation conditions set beforehand are applied at the plurality of timings, generating a trend graph that is made from time series of a prediction result of the concentration in the transient state and the stationary state; and displaying the generated trend graph and the limit of the product specification of the product in a screen.

11. The non-transitory computer-readable storage medium according to claim 10, wherein the program is for causing the computer of the plant operation support device for predicting a concentration of impurity components that determines the quality of the product to be produced in the plant by a simulation based on measurement data of a feed flow rate of a distillation column obtained from the field device arranged in the distillation column in the plant to execute:

operating in parallel synchronizing with the plant and performing a simulation with obtaining the feed flow rate from the field device to estimate the concentration of impurity components that has not been measured in the plant;

estimating periodically the performance parameter of devices used for the estimation of the concentration of impurity components based on the feed flow rate obtained from the field device;

predicting the transient state by the simulation based on the estimated concentration of impurity components; and predicting the stationary state by the simulation based on the estimated concentration of impurity components.

* * * * *